United States Patent
Leuca et al.

(10) Patent No.: US 7,242,931 B2
(45) Date of Patent: Jul. 10, 2007

(54) SYSTEM AND METHOD FOR PROVIDING VOICE AND DATA COMMUNICATIONS BETWEEN PERSONS ONBOARD A MOBILE PLATFORM AND A CELLULAR BASE STATION

(75) Inventors: Ioan Leuca, Bellevue, WA (US); David W Bogart, Renton, WA (US); Michael de La Chapelle, Bellevue, WA (US); Thomas R Ott, Seattle, WA (US)

(73) Assignee: The Boeing Company, Chicago, IL (US)

( * ) Notice: Subject to any disclaimer, the term of this patent is extended or adjusted under 35 U.S.C. 154(b) by 34 days.

(21) Appl. No.: 10/847,131

(22) Filed: May 17, 2004

(65) Prior Publication Data

US 2005/0255845 A1 Nov. 17, 2005

(51) Int. Cl.
*H04Q 7/20* (2006.01)
(52) U.S. Cl. .................................... 455/431
(58) Field of Classification Search ................ 455/431, 455/11.1, 462
See application file for complete search history.

(56) References Cited

U.S. PATENT DOCUMENTS

| | | | |
|---|---|---|---|
| 5,950,129 A * | 9/1999 | Schmid et al. ............. 455/431 |
| 6,324,405 B1 * | 11/2001 | Young et al. ............ 455/456.1 |
| 6,408,180 B1 | 6/2002 | McKenna et al. | |
| 6,477,152 B1 | 11/2002 | Hiett | |
| 6,603,967 B1 * | 8/2003 | Sinivaara et al. .......... 455/431 |
| 6,816,728 B2 * | 11/2004 | Igloi et al. ................. 455/431 |
| 6,856,803 B1 * | 2/2005 | Gross et al. ............... 455/431 |
| 6,885,864 B2 * | 4/2005 | McKenna et al. .......... 455/431 |
| 6,931,248 B2 * | 8/2005 | Borel ....................... 455/431 |
| 2002/0013150 A1 | 1/2002 | McKenna et al. | |

FOREIGN PATENT DOCUMENTS

| | | |
|---|---|---|
| EP | 0 915 577 A2 | 10/1998 |
| EP | 1 096 699 | 5/2001 |
| WO | WO 01/15466 A1 | 8/2000 |

* cited by examiner

*Primary Examiner*—Lester G. Kincaid
*Assistant Examiner*—Gary Au
(74) *Attorney, Agent, or Firm*—Harness, Dickey & Pierce, P.L.C.

(57) ABSTRACT

A communications system and method for providing a cellular communications link between a user traveling on a mobile platform (or at a remote location) and a terrestrial based segment. The system and method uses a radio access segment located on board the mobile platform (or at the remote location) to interface with the user's personal communications device. The bearer terminal facilitates the transmission of information to and from the radio access segment, via an off-platform system, to the terrestrial segment. The terrestrial segment manages the communications link between one or more cellular service providers who are accessing the terrestrial segment and the mobile platform (or a remote site). The system does not limit access to the terrestrial segment to only one cellular service provider but instead allows virtually any number of cellular service providers to access the terrestrial segment and to participate in providing a cellular link to the mobile platform (or a remote site).

9 Claims, 4 Drawing Sheets

SYSTEM AND METHOD FOR PROVIDING VOICE AND DATA COMMUNICATIONS BETWEEN PERSONS ONBOARD A MOBILE PLATFORM AND A CELLULAR BASE STATION

FIELD OF THE INVENTION

The present invention relates to communication systems, and more particularly to a communications system for providing a wireless communications link between one or more occupants on a mobile or remote platform and a terrestrial station, and where the system and method enables equal access to a plurality of terrestrial service providers to enable one or more of the service providers to participate in facilitating the creation of a communications link for the occupant.

BACKGROUND OF THE INVENTION

Providing cellular service to occupants traveling on mobile platforms such as buses, trains, ships or aircraft, or individuals located in remote areas not covered by classical cellular carriers, has proven to be a challenge. This is because cellular phone networks, while well known and ubiquitous, are still providing services in geographically fixed areas. Cell phone users enter cellular networks while physically located within regulatory assigned, geographical regions around the world. The user's personal profile information is then looked up in a carrier's database for access to the serving (local) carrier's network. If the network that the user is physically accessing is not the user's own cellular service provider, then the network is termed a "foreign" network.

When the user is attempting to access his/her cellular service provider through a foreign network, then roaming arrangements between the user's carrier (i.e., home location register (HLR)) and the network access provider (i.e., visitor location register (VLR)) are required in order to provide the user with cellular service in the geographic area covered by the foreign network. Roaming arrangements between all carriers is not ubiquitous and service is denied to the user in regions where these roaming arrangements have not been adopted. Thus, a cost effective, global, equal access method is needed to enable cellular phone use on mobile platforms that often move at high speeds (and particularly so for modern day jet aircraft) across multiple geographic cellular regions, and where no cellular coverage may exist, such as in remote locations, or where coverage is no longer obtainable. The classic cellular roaming arrangement does not provide the capability to connect subscribers where there is no specific cellular infrastructure in place to cover the subscriber's location (e.g., mobile platforms such as aircrafts, ships, trains or in remote locations). Furthermore, no single cellular carrier can justify the implementation of global service coverage due to specific geographic licensed operational constraints. As a result, mobile subscribers (i.e., subscribers traveling on busses, ships, trains and aircraft, etc.) are required to drop existing connections before roaming into a region covered by a foreign network, and then are required to reestablish connections via the new foreign network.

One attempt at alleviating the problem of enabling mobile users to maintain connections with their cellular service provider is to employ the use of "picocells". Picocells have been deployed in confined spaces such as within buildings, and even within specific rooms within a building, to allow occupants to communicate with mobile phones and wireless computing devices. With mobile platform (aircraft, ships, etc.) applications, the major technical problem is that there is no way to connect a mobile or remotely located picocell to the ground based cellular infrastructure at a sufficiently low cost, and with equal access being provided to all cellular service providers capable of serving the mobile or remotely located picocell. Simply connecting to a single cellular service provider would not be a viable solution, as it would exclude the portion of the population not subscribing to that particular cellular carrier's service or to those who have a roaming agreement with that particular cellular carrier. This would also be highly undesirable for the remaining cellular carriers that have been excluded. Furthermore, it is impractical to establish roaming relationships with all cellular carriers. Therefore, it is highly desirable to offer access to all cellular service providers based on what services they can provide to the end users traveling on a mobile platform or located at a remote location.

It therefore would be highly desirable to provide a system and method that allows an occupant on a mobile platform, or in a remote location, the opportunity to establish a wireless communications link with the user's terrestrial-based cellular service provider, and further when the user is outside a geographic coverage region of his/her service provider, and further with the assistance of a foreign network. Such an invention would make it unnecessary to rely on roaming agreements to establish voice and data communications between users on board a mobile platform or in a remote area and each user's own cellular service provider when the user is outside of his/her cellular service provider's geographic coverage region.

SUMMARY OF THE INVENTION

The present invention is directed to a system and method for providing communications between a cellular user on board a mobile platform, or located in a remote area, with a cellular service provider, when the user is outside of the geographic coverage area of any cellular service provider, each user on board a mobile platform or in a remote area can establish a communications link with his/her own service provider, or alternatively with the service provider having a roaming agreement with the user's own service provider.

In one preferred embodiment the system includes an access segment located on board a mobile platform. The access segment communicates with the cellular device of the user located on board the mobile platform and establishes a wireless communications link between the mobile platform and a terrestrial segment via a space based transponder. The terrestrial segment includes a terrestrial carrier interface for communicating with at least one terrestrial based cellular service provider, and more preferably with a plurality of such service providers located in geographically diverse regions. The terrestrial interface is in communication with a controlling subsystem that performs at least one of authentication and registration functions for users who are attempting to establish (or who have established) a communications link with a cellular service provider accessing the system.

In one preferred form the access segment comprises a radio access segment including a mobile base transceiver station located on board the mobile platform. A base station controlling application (BSC) is also located on board the mobile platform. The radio access segment communicates with a platform bearer terminal (PBT) on board the mobile platform that manages control of the communications link established with the mobile platform. The mobile platform is in communication via a space-based transponder with the terrestrial segment, and includes an off-platform bearer terminal (OBT). The OBT participates in managing the communications link with the mobile platform. The OBT is in communications with the terrestrial carrier interface and also with the controlling subsystem. More particularly, the terrestrial carrier interface is coupled to the controlling system and to one or more cellular service providers via a wide area network. The terrestrial carrier interface essentially operates as the egress and ingress point for cellular services between the mobile platform and the terrestrial cellular service provider or providers accessing the system.

The controlling subsystem, in one preferred form, includes a visitor location register (VLR) that is in communication with a mobile switching center (MSC) server. Both of these components communicate via the wide area network with the terrestrial carrier interface. The VLR serves as a temporary repository of users profiles retrieved from a home location register (HLR) located on a specific cellular network. The MSC server controls registration and authentication processes by interpreting and acting on messages relayed to and from a given HLR by the terrestrial carrier interface. In effect, the VLR and the MSC server operate to help process and monitor information needed to establish and maintain communications with each of the users on board the mobile platform and the cellular service networks accessing the terrestrial carrier interface of the system.

The system and method of the present invention thus enables users onboard a mobile platform, or even users at a remote location, to access their cellular service provider or a foreign network acting on behalf of the user's cellular service provider. Importantly, the system and method of the present invention does not discriminate or limit access to only select foreign networks. Instead, any cellular service provider is able to access the network and may participate in providing cellular service to each user on board the mobile platform or each user located at a remote location.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
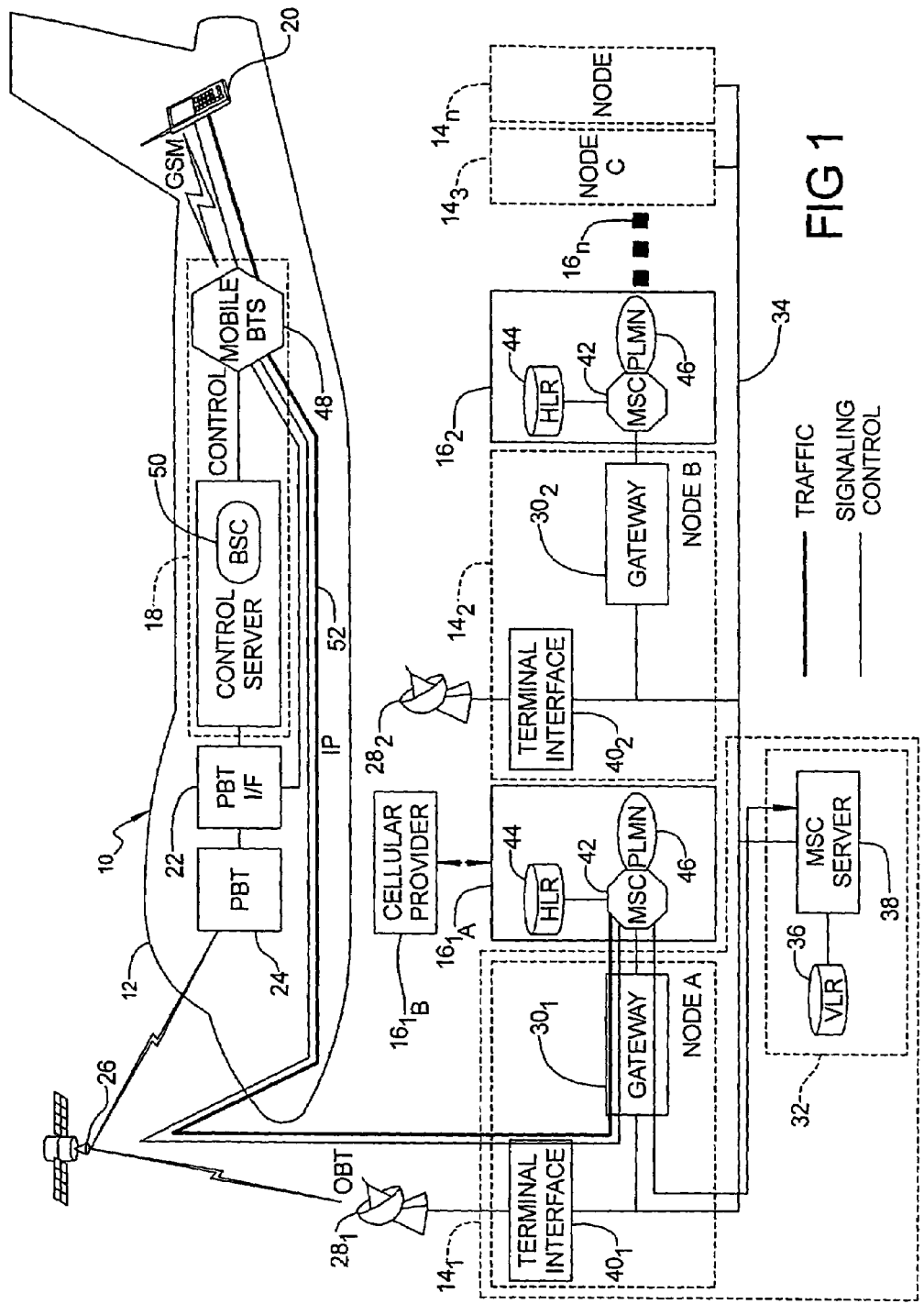
FIG. 1 is a block diagram of a preferred embodiment of the present invention.

Referring to FIG. 1, there is shown a system 10 in accordance with a preferred embodiment of the present invention for enabling a cellular communications link to be established between a user on board a mobile platform 12 and at least one terrestrial segment $14_1$, $14_2$, $14_n$, wherein each terrestrial segment 14 is in communication with one or more cellular service providers 16. More particularly the system 10 enables users traveling on the mobile platform 12, or users located in a remote region, to establish a cellular communications link with at least one of the cellular service providers 16 when the user is outside of a geographic coverage region of his/her own service provider, or of any cellular service provider's coverage region. It is an important advantage of the present invention that cellular service providers are provided with equal access to the system 10 and that the system 10 is not limited to use with only one particular cellular service provider.

The system 10 includes a radio access segment 18 which is located on board the mobile platform 12. It will be appreciated immediately, however, that while the following description will make reference to the user being located on board the mobile platform 12, that the present invention 10 could just as readily be constructed such that the access segment 18 is located at a remote, terrestrial facility rather than on a mobile platform. In either implementation, the present invention allows a user outside of their cellular coverage region to establish a cellular communications link with either their own carrier or a foreign cellular service provider.

Referring further to FIG. 1, the radio access segment is in radio frequency communication with a personal communications device 20 of a user. The access segment 18 effectively forms a "picocell" on board the mobile platform 12 which can be accessed by the personal communications device of any particular user on board the mobile platform 12.

The radio access segment 18 is in communication with a platform bearer terminal (PBT) interface 22 and a platform bearer terminal (PBT) 24. Space-based transponder 26 relays information between the PBT 24 and one or more off-platform bearer terminals 28 each being associated with one terrestrial segment 14. Each OBT 28 is in communication with an associated gateway interface 30, which is interfaced with at least one of the cellular service providers 16 accessing the system 10. Each gateway 30 is further in communication with a controlling subsystem 32 for example via a wide area network 34, a leased line network or the Internet. The controlling subsystem 32 includes a visitor location register (VLR) 36 and a mobile switching center (MSC) server 38 in communication with the VLR 36.

If other data communications are desired as well as voice communications, a terminal interface 40 will be included as part of an associated terrestrial segment 14 for routing voice signaling and traffic data to the gateway interface 30. Components 30 and 40 of a given terrestrial segment 14 can be viewed as forming a single node. Accordingly, components $30_1$ and $40_1$ can be viewed as forming Node A, components $30_2$ and $40_2$ forming Node B, etc. It will be appreciated then that any number of distinct nodes can be formed. Nodes A and B will typically be located at geographically diverse areas possibly separated by hundreds or thousands of miles. However, each is in communication with the controller subsystem 32 via the wide area network 34. The only limitation on the number of distinct nodes that can form the terrestrial segment 14 is the capability of the MSC server 38 and the VLR 36 in managing the exchange of information between all of the cellular service networks 16 and the controller subsystem 32.

With further reference to FIG. 1, a detailed description of the operation of a cellular network will not be described in detail, as this will be well known to those skilled in this art. However, each traditional cellular network 16 can be viewed as including its own public, mobile switching center 42, a home location register (HLR) 44 and a public land mobile network (PLMN) 46. The HLR 44 stores information about subscribers of that particular cellular service provider's network.

The radio access segment 18, as mentioned above, could also be installed at a remote geographic location rather than on the mobile platform 12 as illustrated. Furthermore, while the mobile platform 12 has been illustrated as an aircraft, it will be appreciated that the present invention 10 is not limited to implementation only with aircraft, but could just as readily be implemented on a bus, train, ship or any other vehicle or mobile object where a cellular service connection is desired. The radio access segment 18 includes a mobile base transceiver station 48, a base station controller (BSC) server 50. The standard practice on terrestrial cellular networks is to host the BSC server 50 at a network node dedicated to controlling multiple BTSs 48. However, to avoid binding the BTS 48 to a dedicated terrestrial node, and to avoid using the off-platform link for control messages, the BSC server 50 can be co-located in the proximity of the BTS 48. This does not preclude the location of the BSC 50 from being in a more central location, possibly within one of the terrestrial segments 14, which could then be configured to control multiple BTSs 48 as long as the control information exchanged between the BSC server 50 and the BTS 48 has been adapted to operate properly across the off-platform communications link between the mobile platform 12 and the terrestrial segments 14.

The BTS 48 manages the transmission and reception of the radio frequency (RF) signal from the personal communications device 20 of each user on board the mobile platform 12. The transmitting power of the BTS 48 is selected automatically and controlled so that it provides the minimum power level necessary to access the required areas on the mobile platform 12 or at the remote location where the access segment 18 is located. Since its coverage is commensurate with the physical size of the platform or remote location (i.e., small compared to terrestrial cells), the BTS 48 essentially defines a microcell, a picocell or a nanocell. The physical and logistical characteristics of the RF link provided by the BTS 48 are compliant with standards applicable to terrestrial carriers, thus making it compatible with those of the personal communications devices of the users. The BTS 48 functions to transcode the streams of information consisting of signaling/control and traffic (voice and data) traveling over an internet protocol interface 52 between the BTS 48 and the PBT 24.

The BSC application 50 manages frequency hopping and control of the RF power levels of the BTS 48. It will be noted that no hand over capabilities are required between these two components. The function performed by the BSC application 50 could be implemented in dedicated hardware as is the case in the terrestrial cellular infrastructure, or via a software only implementation that would co-exist with other (unrelated) applications on an on-platform server, as long as that particular server supports a BTS compatible interface.

Referring further to FIG. 1, the PBT interface 22 is required only if other services, besides cellular voice and data, are provided on the mobile platform 12. PBT interface 22 is in charge of priority queuing needed to ensure that voice traffic latency is minimized. PBT 24 is in communication with PBT interface 22 and manages link acquisition, transcoding of signals between the access segment 18 and the off-platform physical and logical formats, in addition to off-platform bearer control.

Each OBT 28 participates in the off-platform link control by assisting with link acquisition, transcoding of signals between the off-platform physical and logical formats and those of its associated terrestrial segment 14, in addition to error control. Each terrestrial segment 14 also provides a signaling and traffic transport and interface between the radio access segment 18 and the terrestrial cellular networks $16_1$–$16_n$.

Each gateway interface 30 performs the following major functions:

interfacing with its associated OBT 28 to transport signaling (authentication and call control) and traffic information in support of cellular voice and data services;

interfacing with one or more terrestrial cellular networks to transport authentication, call control and other SS7 messages (e.g., SMS/EMS/MMS) (Short/Enhanced/Multimedia Messaging Services);

processing signal and traffic information by segregating signaling packets, converting the packets into SS7 format (if needed), routing SS7 packets to associated switches or to an SMSC (Short Messaging Services Center) for the purpose of delivering SMS/EMS/MMS services;

interpreting and acting upon call control messages addressed to itself;

segregating traffic packets, transcoding the packets into PCM format (if needed), multiplexing PCM samples onto the link leading to an associated switch of the terrestrial cellular network 16 (with traffic to/from the terrestrial wireless network being left in a native format).

participating in the registration and authentication processes by relaying SS7/MAP messages between the HLR 44 of a given cellular provider 16 and the MSC server 38.

The VLR 36 of the controlling subsystem 32 essentially operates as a database of temporary information regarding active users that are operating within the control of the MSC server 38. The data held in the VLR 36 is, to a large extent, a copy of the corresponding subscriber data taken from the HLR 44 of the user's cellular service provider 16. The VLR 36 database is preferably truncated to accept only the necessary subscriber information to enable service with the new foreign cellular provider 16 which the user is accessing, with database records being purged at the request of the user's home network HLR 44 such that no long-term records are stored within the VLR database 36. The VLR 36 database also stores mobile platform related data, such as the identifier of the platform BTS 48 and that of the specific gateway 30 serving the mobile platform. The VLR 36 also stores information reported in real time from the mobile platform 12, such as latitude, longitude, and which satellite gateway is in contact with the mobile platform 12, if more than one space-based transponder is employed in the system 10. As will be appreciated by those in the cellular communications art, the HLR 44 located within the cellular network of the cellular provider 16 of the subscriber (i.e., user) stores information about the present location of its subscribers who are visiting in the radio service area of a foreign MSC, for example MSC 38, and indicates whether or not the user may receive calls through the different provider network.

In FIG. 1, it will be appreciated that the space-based transponder provides a two-way wireless communications link between one or more of the terrestrial segments 14. Of course, multiple satellite based transponders could be implemented, and the use of only a single space-based transponder 26 is only to simplify the following exemplary description of operation of the overall system 10.

The OBT $28_1$, $28_1$, etc., of each terrestrial segment $14_1$, $14_2$, etc., is in communication with the space-based transponder 26. Each gateway $30_1$, $30_2$, etc., is typically in communication with one or more cellular service providers 16. For example, cellular service provider $16_1$ is in communication with gateway $30_1$ via a suitable communications scheme, for example an SS7 communications messaging protocol, or possibly even a wide area network, such as the Internet. One or more additional providers $16_{1a}$ may be in contact with provider $16_1$, or connected directly to the gateway $30_1$. For convenience, provider $16_{1a}$ is indicated as being linked, via a roaming agreement, with provider $16_1$, and therefore indirectly in communication with the gateway $30_1$ via provider $16_1$. Thus, it will be appreciated that any cellular provider able to connect directly to the wide area network 34 (anywhere on Earth), or having a roaming arrangement with a provider who is directly connected to any one of the gateways $30_1$, $30_2$, etc., will be able to communicate with its cellular subscriber traveling on the mobile platform 12. As a further example, provider $16_{1B}$ could have roaming agreements with 10 other cellular providers (not indicated in the drawing of FIG. 1). Nevertheless, each of those 10 other cellular providers would have access to the gateway $30_1$ via the link between provider $16_{1A}$ and $16_{1B}$. If one of those 10 providers, for example provider "X", itself had roaming agreements with six other cellular providers, those six other cellular providers would have access to the gateway 30, via the link between provider X, provider $16_{1B}$ and $16_{1A}$. Thus, the system 10 has the capability of exponentially linking to a large number of providers. This feature provides a very flexible arrangement for accommodating virtually any number of independent cellular service providers and providing each with a means to interface with its subscriber (either directly or via a roaming arrangement with a different provider). The only principal limitation is that the mobile platform 12 be in communication with at least one gateway 30. At the present time gateways 30 are established in Ibaraki, Japan; Littleton, Colo.; Leuk, Switzerland; and Moscow, Russia. However, it will be appreciated that the system 10 can be implemented with a greater or lesser plurality of gateways, and further, geographically diverse locations.

Figure 2:
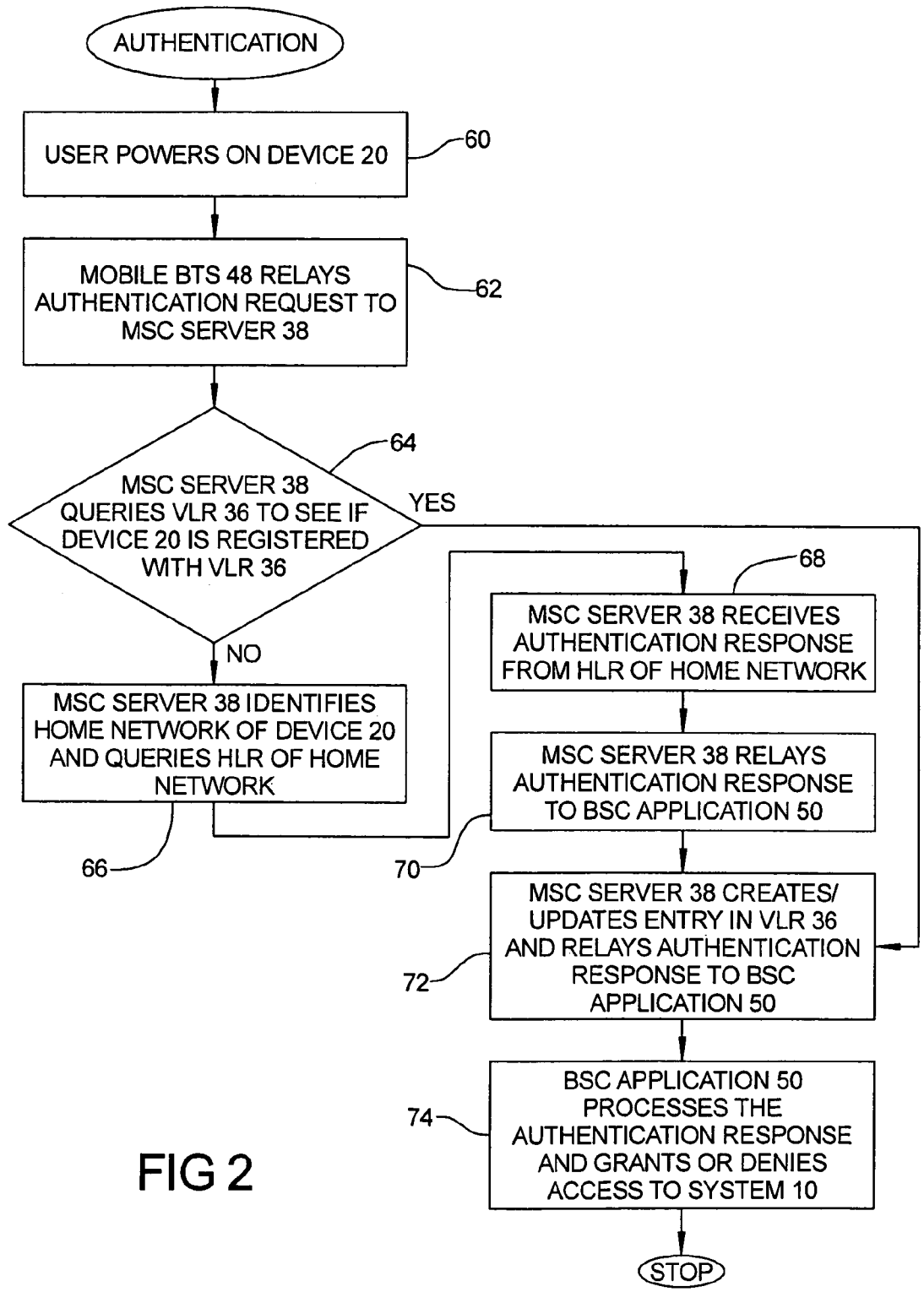
FIG. 2 is a flowchart of the steps performed in authenticating information relating to a user on board the mobile platform.

Referring now to FIG. 2, the steps performed by the system 10 of the present invention in authenticating a wireless communications link will be described. Initially, as indicated at step 60, a user powers on their personal communications device 20. The communications device 20 issues an Authentication Request message. The mobile BTS 48 relays this Authentication request to the MSC server 38, as indicated at step 62. The MSC server 38 uses information contained in the Authentication request to query VLR 36 to determine if the personal communications device 20 is presently registered with the VLR 36, as indicated at step 64. If the device 20 is not registered, then the MSC server 38 identifies the home network (i.e., home provider) associated with the device 20 from the IMSI (International Mobile Subscriber Identity) in the Authentication Request message and queries the HLR of the home network (e.g., HLR 44 of network 162), as indicated at step 66. An SS7/MAP protocol message is used for this purpose. Alternatively, an SS7 over IP protocol message may be used. An SS7 message is preferred as this approach is prevalent with the terrestrial cellular networks.

Referring further to FIG. 2, the MSC server 38 then receives an authentication response from the HLR 44 of the user's home provider network 162, as indicated at step 68. The MSC server 38 then relays an Authentication response to the BSC control application 50, as indicated at step 70.

The MSC server 38 also generates an entry into the VLR database, as indicated at step 72. The BSC control application 50 then grants or denies access to the on-platform 18 network, as indicated at step 74.

Figure 3:
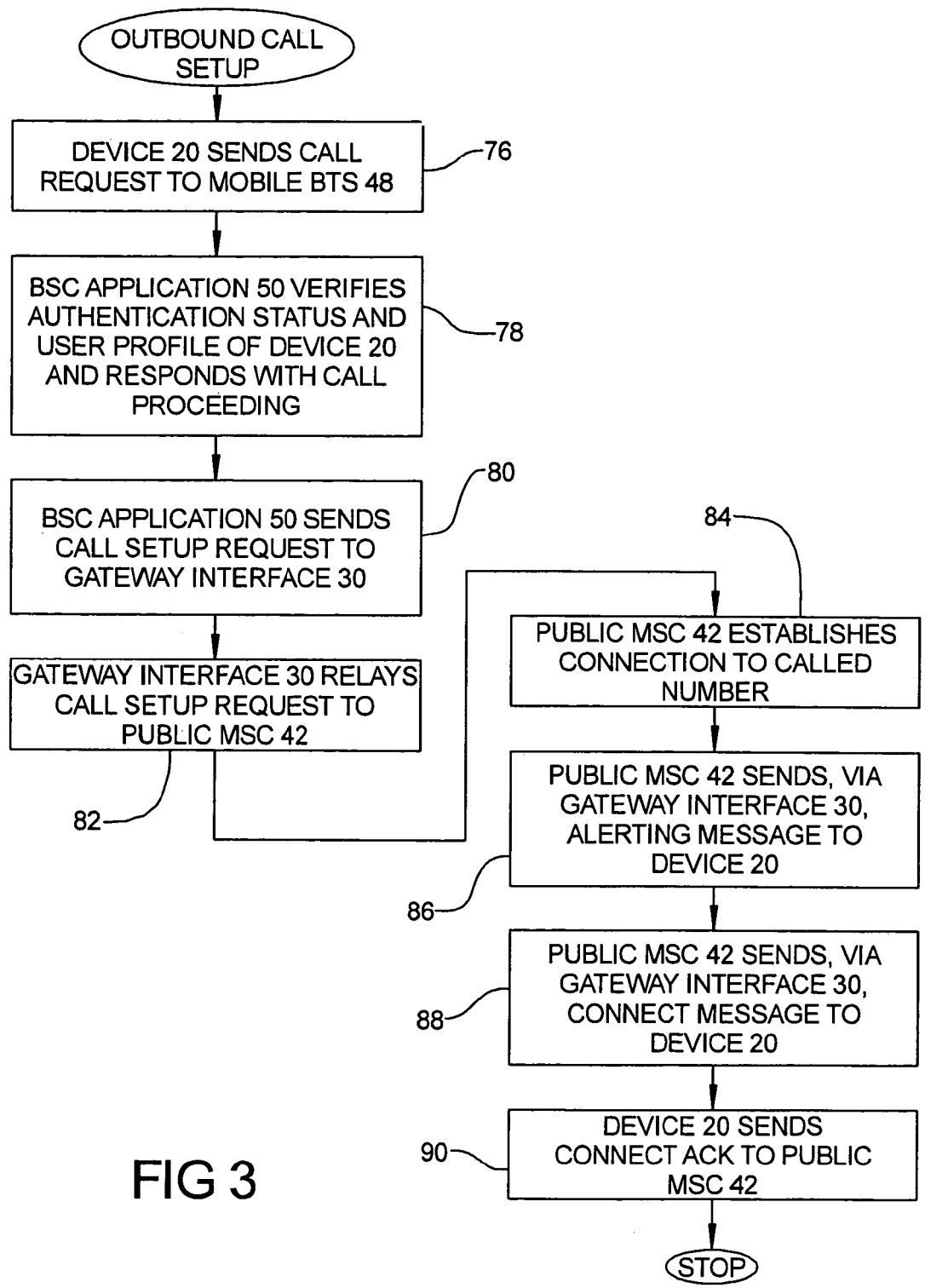
FIG. 3 is a flowchart of the steps involved in making an outbound call from the mobile platform.

Referring now to FIG. 3, the steps involved in carrying out an outbound call (i.e., a call initiated by the user of the personal communications device 20) will be described. Initially the personal communications device 20 sends a call request to the mobile BTS 48, as indicated at step 76. The BSC control application 50 verifies the authentication status of the device 20 and responds with a "Call Proceeding" message sent back to the device 20, as indicated at step 78. The BSC control application 50 then relays the call setup request to at least one gateway interface 30, as shown at step 80. The gateway interface 30 relays this request to the public MSC 42, as indicated at step 82. The public MSC 42 establishes a connection to the called number, as indicated at step 84. The public MSC 42 relays, via the gateway interface 30, an ALERTING message to the device 20 of the user, as indicated at step 86. When the called number goes off hook, the public MSC 42 relays a "CONNECT" message via gateway interface 30 to the personal device 20, as indicated at step 88. The personal communications device 20 then acknowledges call setup completion by sending an acknowledgement message to the public MSC 42, as indicated at step 90.

Figure 4:
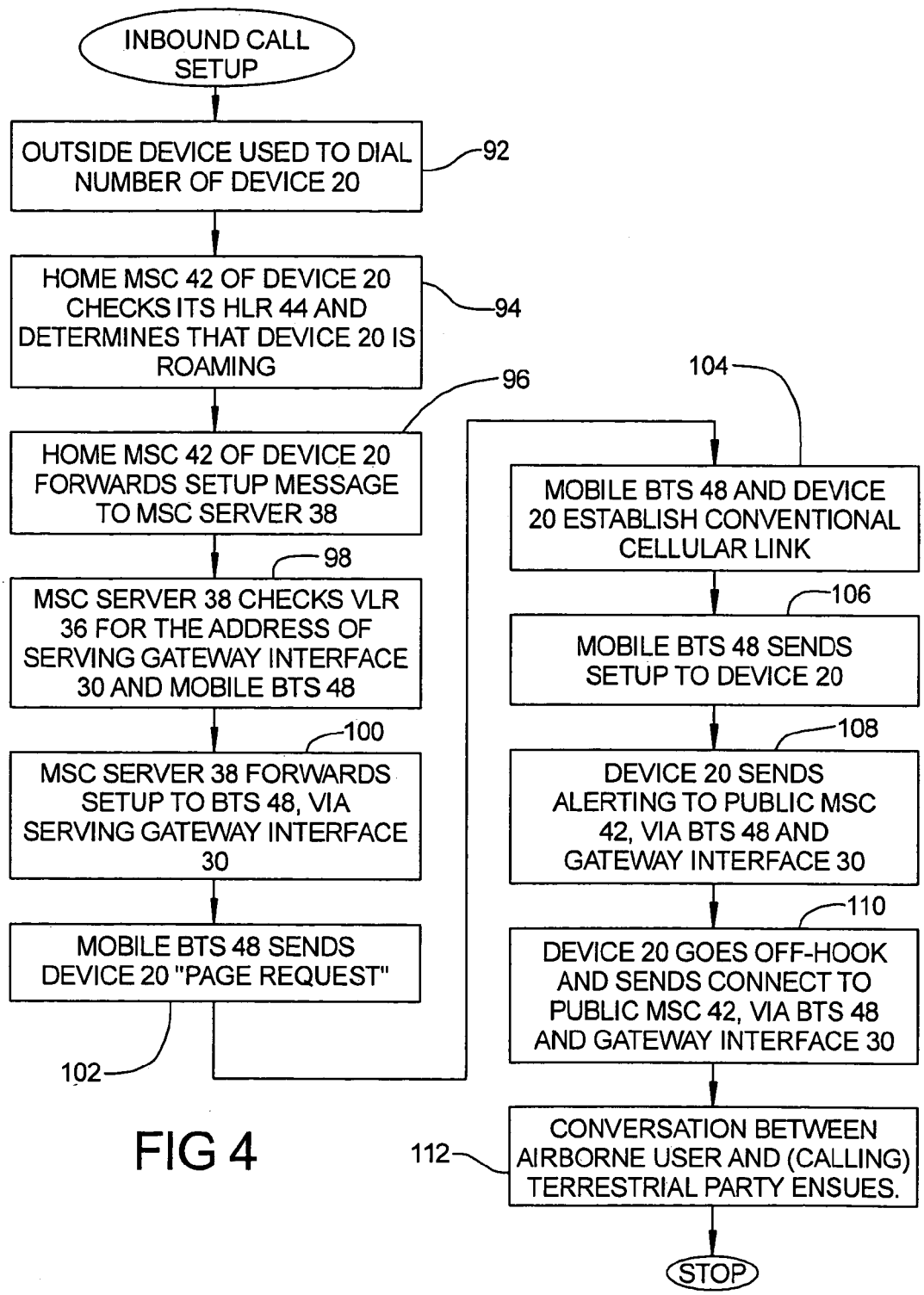
FIG. 4 is a flowchart of the steps involved in making an incoming call to the mobile platform.

Referring now to FIG. 4, a description of a typical inbound call setup from the terrestrial segment 14 to the personal communication device 20 will be described. Initially, an outside (i.e., terrestrial based or located on a different mobile platform) device is used to dial the number of the personal communications device 20 of the user, and the home MSC 42 of the user is contacted, as indicated at step 92. The home MSC 42 of the user (i.e., subscriber) looks up the mobile number in the HLR 44 of the home network and determines that the device 20 is now roaming on the terrestrial segment 14 of the system 10, as indicated at step 94. The public MSC 42 of the user's home network then forwards the "call setup" request to the MSC server 38, as indicated at step 96. The MSC server 38 then looks up the called number in the VLR 36 and determines the appropriate serving gateway interface (either $30_1$, $30_2$, etc.) identification and the mobile BTS identification, as indicated at step 98. The IP address of the interface 30 and that of the BTS 48 will be used. The MSC server 38 then forwards a "call setup" request to the BTS 48 on the mobile platform 12 via the proper gateway interface 30, as indicated at step 100. The mobile BTS 48 then sends the personal communications device 20 a "Page" request, as indicated at step 102. The mobile BTS 48 and the device 20 then establish a communication link according to standard, well known cellular protocol practices, as indicated at step 104. The mobile BTS 48 then sends a "Setup" request to the personal communications device 20, as indicated at step 106. The mobile device 20 then acknowledges the Setup request by sending an "Alerting" message back to the BTS 48, as indicated at step 108. When mobile device 20 goes off hook it sends a "Connect" message to the BTS 48, as indicated at step 110. The conversation between the user of the personal communication device 20 and the calling party then ensues, as indicated at step 112.

The system and method of the present invention thus forms a means by which a cellular communications link can be established with each personal communications device of a user onboard a mobile platform, or each user located at a remote site outside of a coverage region of their cellular service provider. Importantly, the system does not limit access to only one cellular service provider but rather allows any practical number of cellular service providers to participate in providing service to the users on board the mobile platform or who are located at a remote site. The system and method of the present invention is further not limited to voice information but is just as readily available to handling the transmission of data between the user's personal communications device 20 and a terrestrial correspondent supported by a terrestrial network $16_1$–$16_n$ of the present invention.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A system for providing cellular service to a plurality of individuals, with at least one of said individuals being located outside a coverage region of an associated cellular service network, said system comprising:

an access segment located sufficiently close to said individual to establish a wireless communications link with a personal cellular communications device of said individual, and for facilitating bi-directional wireless communications with said device;

said access segment including:
      a wireless base station transceiver (BTS) for facilitating bi-directional wireless communications with said device; and
      a BTS controller for managing wireless resources of said BTS and for facilitating mobility of said access segment;

at least one terrestrial segment for interfacing with at least one terrestrial wireless service provider network via a wide area network, said terrestrial segment including a universal visitor location register (VLR) database to maintain user identification information for said individuals in communication with said access segment, said VLR further operating to hold user identification information as said individuals travel through a plurality of distinct service subregions that is able to be accessed by a plurality of independent wireless service providers;

a transponded satellite for relaying wireless signals between said access segment and said terrestrial segment; and said terrestrial segment and said wide area network enabling said terrestrial wireless service provider network to be used to provide wireless service to said devices of said individuals that are recognized by said wireless service providers from information held in said VLR, as individuals authorized to access said provider's wireless network.

2. The system of claim 1, further comprising a bearer terminal located in a vicinity of said access segment for facilitating wireless communications between access segment and said terrestrial network.

3. The system of claim 1, wherein said terrestrial segment includes a controlling subsystem for controlling access to said terrestrial segment by said terrestrial network.

4. The system of claim 3, wherein said controlling subsystem includes a mobile switching center server for controlling authentication and registration information transmitted between said terrestrial wireless service provider network and said terrestrial segment.

5. The system of claim 3, wherein said controlling subsystem includes said visitor location register (VLR), and said VLR temporarily holds information pertaining to each said individual received from said individual's home wireless network.

6. The system of claim 3, wherein each said individual is located on a mobile platform or in a region remote from said coverage region of any wireless service provider; and
   said VLR temporarily holds information pertaining to said mobile platform or said region remote from said coverage region.

7. A system for providing cellular service to a plurality of individuals located at an area remote from a region covered by each said individual's cellular service network, and where at least a pair of independent cellular service providers are serving two different individuals, the system comprising:

an access segment located sufficiently close to said individual to establish a wireless communications link with a personal cellular communications device of each said individual, and for enabling wireless communication with said devices of said users;

said access segment including a base station controller for coordinating communications with each of said independent cellular service providers accessing said system and said personal cellular communications devices;

a terrestrial segment for interfacing with a plurality of independent cellular terrestrial networks operated by said independent cellular service providers, via a wide area network;

a transponded satellite for relaying wireless signals between said access segment and said terrestrial segment; and said terrestrial segment including a universal visitor location register (VLR) for receiving information pertaining to a real time location of a given one of said individuals, the VLR enabling any one of said independent cellular terrestrial networks to determine, via accessing said wide area network and said VLR, if said given individual is an authorized user, and to handle a cellular call placed by, or directed to, said given individual.

8. The system of claim 7, wherein said individuals are located on a mobile platform; and
   wherein said mobile platform transmits real time location information to said location register to update said visitor location register with position information relating to each said individual.

9. A method for establishing cellular communications links between a plurality of electronic devices located within a geographic area, and being used by a plurality of individuals, and a plurality of independent terrestrial based cellular service providers, comprising:

using an access segment having a base station transceiver, and located in proximity to said electronic devices, to establish and manage a wireless communications link with each said electronic device;

using a terrestrial segment to interface with said terrestrial based cellular service providers;

relaying wireless signals between said terrestrial segment and said access segment to establish wireless communications links between said electronic devices and said terrestrial based cellular service providers; and communicating subscriber information concerning each of said individuals between each of said terrestrial based cellular service provider and a universal visitor location register (VLR) in said terrestrial segment, via a wide area network, to enable each of said cellular service providers to determine if any one of said individuals is authorized to access its cellular network.

* * * * *